US008386426B2

(12) United States Patent
Owen, Jr. et al.

(10) Patent No.: US 8,386,426 B2
(45) Date of Patent: Feb. 26, 2013

(54) SYSTEM AND METHOD FOR EDITING CARTOGRAPHIC DATA

(75) Inventors: Stanley M. Owen, Jr., Huntsville, AL (US); Eric M. Schwartz, Madison, AL (US); Prashanti Seri Somaiah, Andhra Pradesh (IN); Chandrasekharam Somanchi, Andhra Pradesh (IN); Dheeraj Kumar Deveneni, Andhra Pradesh (IN)

(73) Assignee: Intergraph Software Technologies Company, Las Vegas, NV (US)

( * ) Notice: Subject to any disclaimer, the term of this patent is extended or adjusted under 35 U.S.C. 154(b) by 445 days.

(21) Appl. No.: 12/334,244

(22) Filed: Dec. 12, 2008

(65) Prior Publication Data

US 2009/0157718 A1    Jun. 18, 2009

Related U.S. Application Data

(60) Provisional application No. 61/013,635, filed on Dec. 13, 2007.

(51) Int. Cl.
*G06F 17/00* (2006.01)

(52) U.S. Cl. ........ 707/624; 707/734; 707/805; 707/918; 340/995.1; 345/418; 701/400

(58) Field of Classification Search ............... 707/743, 707/805, 918, 919, 920, 921, 999.1, 999.003, 707/624; 340/995.1–995.28; 345/418; 701/200, 701/400
See application file for complete search history.

(56) References Cited

U.S. PATENT DOCUMENTS

| | | | |
|---|---|---|---|
| 5,020,122 A | 5/1991 | Walsh et al. | 382/56 |
| 5,197,120 A | 3/1993 | Saxton et al. | 395/139 |
| 6,246,417 B1 * | 6/2001 | Kambe et al. | 345/619 |
| 6,343,301 B1 * | 1/2002 | Halt et al. | 1/1 |
| 6,453,233 B1 * | 9/2002 | Kato | 701/208 |
| 7,086,028 B1 | 8/2006 | Davis et al. | 716/11 |
| 7,103,854 B2 * | 9/2006 | Fuchs et al. | 715/855 |
| 2005/0021510 A1 * | 1/2005 | Uchida et al. | 707/3 |

(Continued)

FOREIGN PATENT DOCUMENTS

WO    WO 97/07467    2/1997

OTHER PUBLICATIONS

Arikawa M. Ed, et al., Institute of Electrical and Electronics Engineers: "Personal Dynamic Maps Based on Distributed Geographic Information Servers" Proceedings of the Vehicle Navigation and Information Systems Conference. Arikawa M., Aug. 31-Sep. 2, 1994; [Proceedings of the Vehicle Navigation and Information Systems Conference], New York, IEEE, US Aug. 31, 1994, pp. 591-596, XP000612712.

(Continued)

*Primary Examiner* — Dennis Truong
(74) *Attorney, Agent, or Firm* — Sunstein Kann Murphy & Timbers LLP

(57) ABSTRACT

Systems, methods, and computer program products for editing and displaying cartographic data are described. Cartographic source data is retrieved from a first record set and displayed in a display device. Based on a selection by a user of a feature in the display device, source data corresponding to the selected feature is selected. Based on a modification of the selected feature by the user in the display device, cartographic edit data is created. The cartographic edit data is associated with the cartographic source data for the feature and the associated cartographic edit data is stored within a second record set that is editable by the user. An output record set is created for display on the display device, at least in part, from the associated cartographic edit data for the feature.

39 Claims, 11 Drawing Sheets

U.S. PATENT DOCUMENTS

| | | | | |
|---|---|---|---|---|
| 2005/0264566 | A1* | 12/2005 | Sommers | 345/423 |
| 2007/0038962 | A1* | 2/2007 | Fuchs et al. | 715/855 |
| 2007/0210937 | A1* | 9/2007 | Smith et al. | 340/995.1 |
| 2008/0086262 | A1* | 4/2008 | Asahara et al. | 701/208 |
| 2008/0091742 | A1* | 4/2008 | Marshall | 707/203 |
| 2008/0147824 | A1* | 6/2008 | Hendrey | 709/218 |

OTHER PUBLICATIONS

Bouvin, Niels Olof, et al., "HyCon: a framework for context-aware mobile hypermedia," New Review of Hypermedia and Multimedia, vol. 9, No. 1, Jan. 1, 2003, pp. 59-88, XP00813774.

Potmesil, et al. "Maps alive: viewing geospatial information on the WWW", Computer Networks and ISDN Systems, North Holland Publishing, Amsterdam, NL vol. 29, No. 8-13, pp. 1327-1342, Sep. 1, 1997, XP004095328.

"Quikmaps.com—Maps for the Masses," Web 2.0 Teaching Tools, Web 2.0 Teaching Tools, [Online], Aug. 3, 2006, pp. 1-2, XP002519396, retrieved from the Internet: URL: http://web20teach.blogspot.com/2006/08/quikmapscom-maps-for-masses.html,..[retrieved on Mar. 16, 2009], the whole document.

Authorized Officer Cristina Dumitrescu, PCT/US2008/086680, International Search Report and Written Opinion, Mar. 18, 2009, 11 pages.

* cited by examiner

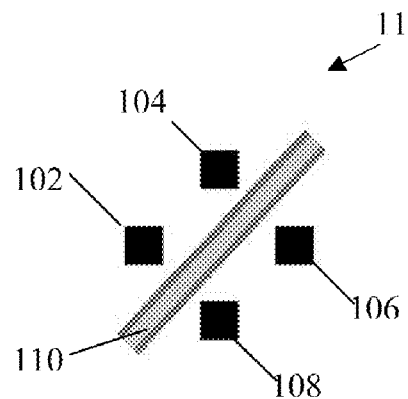
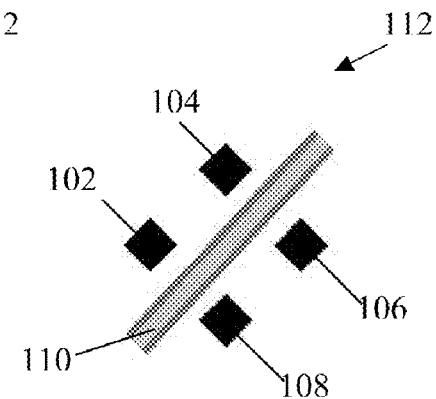
FIG. 1A   FIG. 1B
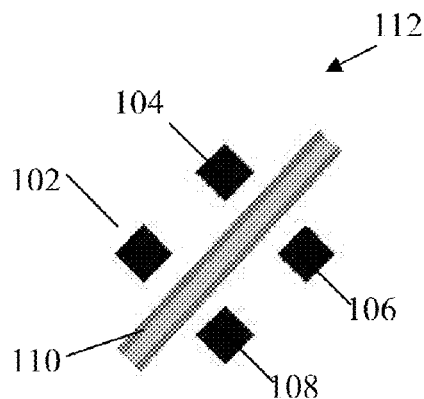
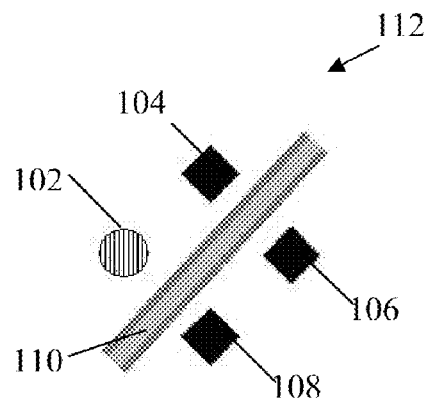
FIG. 2A   FIG. 2B
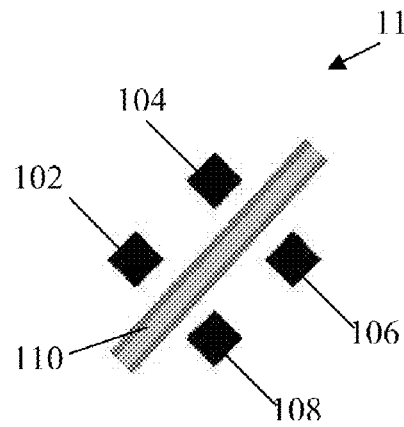
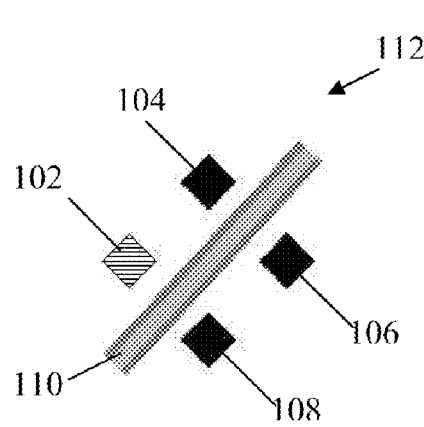
FIG. 3A   FIG. 3B

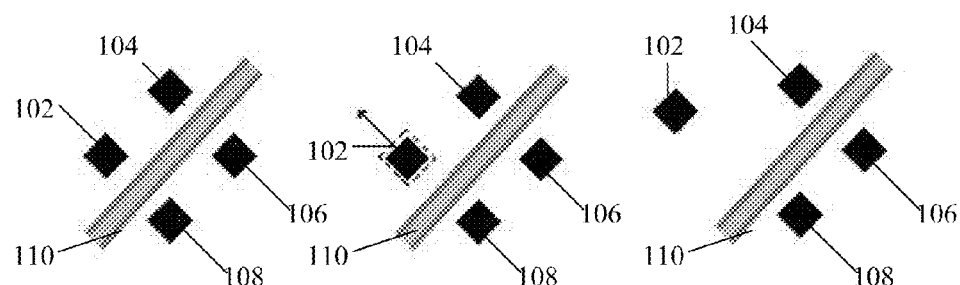
FIG. 4A  FIG. 4B  FIG. 4C
| Highway 84 | |
|---|---|
| Year Built: | 1968 |
| Number of Lanes: | 4 |
| Designation: | Interstate |
| Road Surface: | Asphalt |
| Road Width: | 50 ft |
| Road Length: | 456 miles |
502 — Year Built
504 — Number of Lanes
506 — Designation
508 — Road Surface
510 — Road Width
512 — Road Length
| Highway 84 | |
|---|---|
| Year Built: | 1968 |
| Number of Lanes: | 6 |
| Designation: | Interstate |
| Road Surface: | Asphalt |
| Road Width: | 70 ft |
| Road Length: | 456 miles |
514 — Number of Lanes
516 — Road Width
FIG. 5A  FIG. 5B

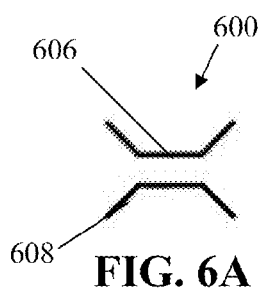 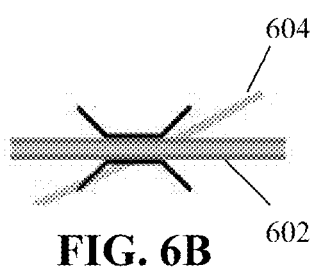 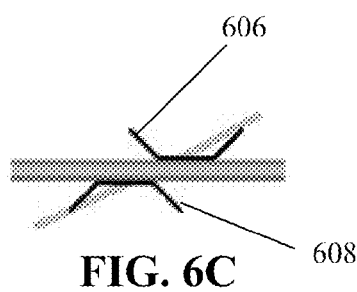
FIG. 6A  FIG. 6B  FIG. 6C
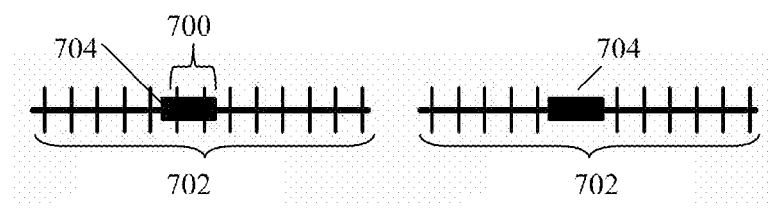
FIG. 7A  FIG. 7B

SYSTEM AND METHOD FOR EDITING CARTOGRAPHIC DATA

The present application claims the benefit of U.S. Application Ser. No. 61/013,635, filed Dec. 13, 2007, which application is incorporated herein by reference in its entirety.

TECHNICAL FIELD

The present invention relates generally to systems and methods for editing and displaying data, and more particularly to editing and displaying cartographic data.

BACKGROUND ART

Cartographic editing systems typically allow users to edit read-and-write cartographic data and then save their edits. For example, the systems may allow a user to change the location of a bridge along the Rio Grande River in a cartographic representation of Alamosa County. Some systems allow the user to save the new location of the bridge by overwriting the source file. However, by overwriting the source file, the original cartographic representation in the source file is lost. Alternatively, systems may allow the user to save the new location of the bridge by saving the changes as a new revision of the cartographic representation. Yet, if the user saves the new location of the bridge as a new revision, then entire source files for the representation are duplicated and stored as new files. Multiple revisions of large source files may consume substantial amounts of memory. Furthermore, if the cartographic data is in a read-only format, then the user is not able to edit and save the edits performed on the read-only data. Accordingly, current systems of editing and storing edits to cartographic data are not very efficient.

SUMMARY OF THE INVENTION

Illustrative embodiments of the present invention are directed to methods, systems, and computer program products for editing cartographic data. Various embodiments of the present invention associate cartographic source data with cartographic edit data to provide a user with the capability to perform instance based edits to features and to provide the user with the perception that he is editing read-only data. The method of the present invention is performed in a computer system. The method includes retrieving cartographic source data from a first record set and displaying at least one source feature of the source data in a display device. A user may select one of the features in the display device. Based on the user's selection of a feature in the display device, source data corresponding to the feature is selected. The user may also modify the selected feature. Based on the user's modification of the selected feature in the display device, cartographic edit data representing the user's modification of the feature is created. The cartographic edit data, representing the user modification of the feature, is associated with the cartographic source data for the feature. The associated cartographic edit data is then stored within a second record set.

A system for editing cartographic data of the present invention includes a display device that displays at least one feature of cartographic source data and a user input device that a user can use to select and modify features in the display device. A processor retrieves cartographic source data from a first record set and selects source data corresponding to a feature selected by the user. Based on the user's modification of the selected feature, the processor creates cartographic edit data representing the modification of the feature and associates the cartographic edit data, representing the modification of the feature, with the cartographic source data for the feature. The system also includes a digital memory for storing the associated cartographic edit data within a second record set.

The invention may also be embodied as a computer program product for use on a computer system for editing cartographic data. The computer program product includes a computer readable storage medium having computer readable code. The computer readable program code includes computer code for retrieving cartographic source data from a first record set and displaying at least one feature of the source data in a display device. The invention as embodied, can select source data corresponding to a selected feature based on the user's selection of the feature in the display device. The computer program product creates cartographic edit data representing the user's modification of the selected feature in the display device. The product also associates the cartographic edit data, representing the user modification of the feature, with the cartographic source data for the feature. The product then stores the associated cartographic edit data within a second record set.

Some or all of the above described embodiments may associate the cartographic edit data with the cartographic source data for the feature by assigning an identifier to the edit data matching an identifier for the source data. Furthermore, in some or all of the above described embodiments, the cartographic source data may be read-only data. The first record set may be stored in a first database and the second record set may be stored in a second database. The source data may also represent a physical geographic location. Also, the cartographic edit data may be geometry data, style data, and/or attribute data. Additionally or alternately, the cartographic edit data may represent a feature instance edit.

Illustrative embodiments of the present invention are also directed to methods, systems, and computer program products for displaying cartographic data. Various embodiments of the present invention merge cartographic source data with cartographic edit data, but also retain identity information for the edit data and source data even after the data is merged. In this way, illustrative embodiments ensure that the original source data will not be overwritten because the edits will be stored separately from the original source data. The computer based method includes retrieving cartographic source data for a feature from a first record set and cartographic edit data associated with the source data from a second record set. The source data for the feature and the associated cartographic edit data for the feature are merged to create an output record set for display on a display device.

In some embodiments, the method may incorporate elements of the method for editing cartographic data. For example, based on user's selection of the feature in the display device, the method may select the source data corresponding to the selected feature. Based on the user's modification of the feature in the display device, the method may create cartographic edit data representing the user's modification of the feature. The cartographic edit data, representing the user modification of the feature, may be associated with the cartographic source data for the feature. Also, the method may store the associated cartographic edit data within the second record set.

A system for editing cartographic data of the present invention includes a display device that displays an output record set. A processor retrieves the cartographic source data for a feature from a first record set and retrieves cartographic edit data associated with the source data from a second record set. The processor merges the source data for the feature with the associated cartographic edit data for the feature to create the output record set for display on the display device.

In various embodiments, a system for editing cartographic data may also include a user input device. The user may use the input device to select and modify features in the display device. Based on the user's selection of the feature in the display device, the processor may select source data corresponding to the user's selected feature selected. Furthermore, the processor creates cartographic edit data representing the user's modification of the feature in the display device. The processor may then associate the cartographic edit data, representing the modification of the feature, with the cartographic source data for the feature. The system may also further include a digital memory for storing the associated cartographic edit data within the second record set.

The invention may be embodied as a computer program product for use on a computer system for displaying cartographic data. The computer program product includes a computer readable storage medium having computer readable code. The computer readable program code includes computer code for retrieving cartographic source data for a feature from a first record set and cartographic edit data associated with the source data from a second record set. The computer program product merges the source data for the feature with the associated cartographic edit data for the feature to create an output record set for display on a display device.

Illustrative embodiments of the computer program product may also include code for editing cartographic data. Such a computer program product may include instructions for selecting source data corresponding to a user selected feature in the display device. The product may create cartographic edit data representing the user's modification of the selected feature in the display device. The product may also associate the cartographic edit data, representing the user modification of the feature, with the cartographic source data for the feature. Embodiments of the invention may then assign an identifier to the edit data matching an identifier for the source data. The edit data is stored within a second record set.

Some or all of the above described embodiments for displaying data may merge the cartographic edit data with the source data for the feature by matching the associated cartographic edit data to the cartographic source data for the feature. If the source data for the feature has no match with cartographic edit data, the output record set for the feature is created based on the cartographic source data. If the source data for the feature has a match to associated cartographic edit data and associated cartographic edit data does not exist for every display parameter of the feature, then the output record set for the feature is created based on both the cartographic source data and the associated cartographic edit data for the feature. If source data for a feature has a match to associated cartographic edit data and associated cartographic edit data exists for every display parameter of the feature, then the output record set for the feature is created based only on the associated cartographic edit data for the feature.

Also, in some or all of the above described embodiments for displaying data, the cartographic source data for the feature and the associated cartographic edit data for the feature may have a matching identifier. Furthermore, the cartographic source data may be read-only data. The first record set may be stored in a first database and the second record set may be stored in a second database. Additionally or alternatively, the source data may represent a physical geographic location. In some or all embodiments, the cartographic edit data may be geometry data, style data, and/or attribute data. Additionally or alternately, the cartographic edit data may represent a feature instance edit.

BRIEF DESCRIPTION OF THE DRAWINGS

The foregoing features of the invention will be more readily understood by reference to the following detailed description, taken with reference to the accompanying drawings, in which:

FIGS. 1A and 1B show an example of a feature-class edit for a set of features;

FIGS. 2A and 2B show an example of an instance edit for a feature in accordance with one embodiment of the present invention;

FIGS. 3A and 3B show another example of a style-instance edit for a feature in accordance with one embodiment of the present invention;

FIGS. 4A, 4B, and 4C show an example of a geometry edit for a feature in accordance with one embodiment of the invention;

FIGS. 5A and 5B show an example of an attribute edit for a feature in accordance with one embodiment of the invention;

FIGS. 6A, 6B, and 6C show an example of a converted style edit for a feature in accordance with one embodiment of the invention;

FIGS. 7A and 7B show another example of a converted style edit for a feature in accordance with one embodiment of the invention;

DETAILED DESCRIPTION OF SPECIFIC EMBODIMENTS

Figure 8:
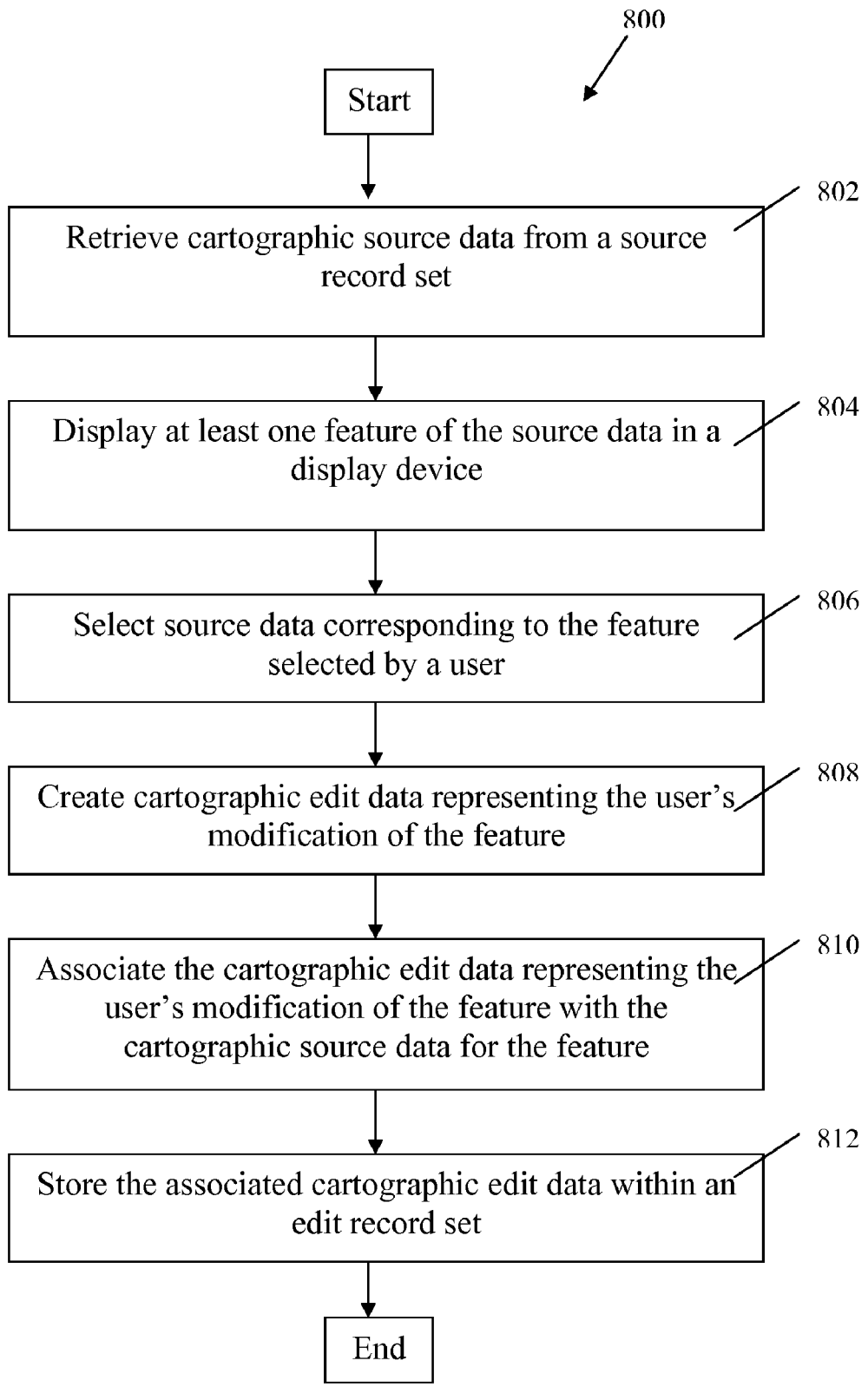
FIG. 8 shows a method for editing cartographic data in accordance with one embodiment of the present invention.

Illustrative embodiments of the present invention are directed to systems and methods for editing and displaying cartographic data. Various embodiments of the present invention associate and merge cartographic source data with cartographic edit data to provide a user with the capability to perform instance based edits on features and to provide the user with the perception that he is editing read-only data. The associations created by illustrative embodiment of the present invention retain identity information for the edit data and source data even after the data is merged. In this way, illustrative embodiments ensure that the original source data will not be overwritten because the edits will be stored separately from the original source data. Details of illustrative embodiments are discussed below.

FIGS. 1A and 1B show an example of a feature-class edit for a set of features. FIG. 1A shows a cartographic representation of four buildings 102, 104, 106, 108 alongside a road 110. The four buildings and road constitute features on a map 112. Features may include, buildings, rivers, roads, railways, bridges, tunnels, forests, valleys, mountains, cities, towns, states, pipelines, pipes, electrical grids, or any other manmade or natural element that can be represented cartographically or geographically. The location and geometry of a feature on a map may be defined by points in a coordinate system, or by vectors defining a line or an area, or by any spatial combination of points and vectors. Edits can be made for a particular instance of a feature or, as in this case, an edit can be made to a feature that is then applied across the entire class. Thus, a feature-class edit will change the feature wherever it appears on the map.

Typically, in cartography, symbols are used to represent features. For example, in FIG. 1A, the black square symbols represent buildings 102, 104, 106, 108. The black squares are displayed so that they correspond with the location of the buildings on the map 112. In this way, the symbols are displayed so that they represent the actual physical location of the buildings. Symbols may also conform to the geometry of the feature. For example, in FIG. 1A, the three parallel lines that represent the road 110 trace the linear path of the road across the map. Symbols may also be used as labels. Such symbols may be displayed on top of or adjacent to a feature. For example, highways are typically designated by displaying a highway number shield over at least part of the linear path of the highway.

In current cartographic data formats, it is common for related features to be categorized as part of a feature class. Features in a feature class are typically represented with common symbols. For example, the buildings 102, 104, 106, 108 shown in FIG. 1A can be categorized as part of a feature class. The feature class is represented by a common symbol (e.g., a black square). Common symbols for related features are typically stored and referenced in a legend. Some cartographic editing systems allow a user to modify the symbol for a class of features in the legend. Accordingly, a modification of the symbol in the legend will result in a corresponding modification for the entire feature class. FIGS. 1A and 1B depict an example of a feature-class edit. In FIG. 1A, each of the four buildings 102, 104, 106, 108 are represented with a square. By, for example, changing the symbol representing buildings from a square to a diamond in the legend, the user can change the symbol for the entire feature class. In FIG. 1B, after the feature-class edit, each building 102, 104, 106, 108 is represented by a black diamond.

FIGS. 2A and 2B show an example of an instance edit in accordance with one embodiment of the invention. FIG. 2A shows four buildings 102, 104, 106, 108 represented by four black diamonds. By selecting one of the four buildings 102, the user can modify the symbol representing one of the buildings. For example, in FIG. 2B, the symbol representing one of the buildings 102 is modified from a black diamond to a red circle. FIGS. 3A and 3B show another example of an instance edit. In FIG. 3B, the symbol representing one of the buildings 102 is modified from a black diamond to a blue diamond.

The instance edits and feature-class edits shown in FIGS. 1B, 2B, and 3B are example of style edits. A style edit is any change to the style data for a feature. Style data is a set of criterion that define how the geometry of a feature is rendered for display or output to another file. For example, the style data for a line may include the color, translucency, and width of the line. The style data for a symbol may include the size, shape, color, translucency, typeface, and font style for the symbol. The edit shown in FIG. 1B is a class-style edit because the edit changes the shape of a symbol for all of the members of the feature class. The edits shown in FIGS. 2B and 3B are instance-style edits because the edits change the shape or color of a symbol for only some of the members of a feature class.

FIGS. 4A, 4B, and 4C show an example of a geometry edit for a feature in accordance with one embodiment of the invention. A geometry edit is any change to the geometry data for a feature. Any change to the geometry or location of a feature is a geometry edit because the underlying point and/or vector defining the feature is modified. For example, FIG. 4A shows four buildings 102, 104, 106, 108 alongside the road 110. FIG. 4B shows the user selecting one of the buildings 102 (with, for example, a cursor) and dragging the building away from road 110. FIG. 4C shows the new location of the building. The new location of the building is a geometry edit because the feature will now be displayed in a different location.

FIGS. 5A and 5B show an example of an attribute edit for a feature in accordance with one embodiment of the invention. Many times features include attribute data. Attribute data is descriptive information associated with the feature, which may be textual, numeric, or may be encoded by using standard encoding mechanisms. The attributes for a feature may be presented to a user when the user selects the feature. In FIG. 5A, attribute data 500 is presented for a highway. The attribute data includes the year the highway was built 502, the number of lanes 504, the composition of the road surface 508, the road width 510, and the road length 512. An attribute edit is any change to the descriptive information associated with a feature. For example, in FIG. 5B, the attribute data is updated to account for an expansion in the number of lanes for the road 514, 516. Attribute data for a particular state or county may include the area, population, and other demographic data. Together, the style data, geometry data, and attribute data comprise the display parameters for a feature.

FIGS. 6A, 6B, and 6C show an example of a converted style edit for a feature in accordance with one embodiment of the invention. Illustrative embodiments of the present invention advantageously use a technique known as prestroking. Prestroking allows a symbol to be converted into its constituent elements so that each one of the elements can be separately edited by the user. FIG. 6A shows a symbol 600 that typically represents a bridge. FIG. 6B shows an example of how the symbol would be seen on the map. The bridge symbol is shown as supporting a road 602 over a crossing stream 604. Initially, the two constituent elements 606, 608 of the symbol are part of the same geometric element, but after the prestroking operation, the two constituent elements are defined as separate geometric elements that can be independently edited. The conversion of a symbol into a pre-stroked symbol is referred to as a converted style edit. In FIG. 6C, one of the constituent elements 606 of a point symbol bridge has been displaced to align the bridge with the crossing stream. The displacement of one of the constituent elements of a point symbol is a geometry edit to a converted style symbol. A modification to the color of one of the elements of the symbol is a style edit to a converted style symbol (not depicted).

FIGS. 7A and 7B show another example of a converted style edit for a symbol in accordance with one embodiment of the invention. Such converted style edits advantageously allow a user to resolve cartographic overprinting and/or overcrowding. For example, in FIG. 7A, two cross ties 700 of a railway symbol 702 conflict with the symbol for an in-line railway station 704. Ideally, the cross ties under the railway station should not be displayed. By prestroking the railway symbol into its constituent cross ties, the user can remove the two cross ties located under the railway station symbol. FIG. 7B shows a corrected railway symbol 702 with an inline railway station symbol 704.

A symbol may be prestroked by mimicking the constituent elements of the symbol with basic shapes, line dimensions, colors, and textual characters. When a prestroking operation occurs, the geometries and styles elements that best mimic the symbol are selected and associated with the symbol. The selected shapes, line dimensions, colors, and textual characters are stored in a record set. The mimicked geometry and style elements may then be independently edited.

FIG. 8 shows a method for editing cartographic data in accordance with illustrative embodiments of the present invention 800. The method is performed in a computer system that is in communication with a display device. Cartographic source data is retrieved from a source record set 802. A source record set may have one or more records. The cartographic source data may include geometry data and attribute data for a single or number of different feature classes that are viewable on a display device. In some instances, the source data may be read-only data. The source data can also come from a variety of different source databases with a variety of different structural formats. For example, the source data may be from an Oracle, Microsoft SQL Server, and/or Microsoft Access database.

The cartographic source data may be representative of physical geographic locations, such as a real properties, buildings, towns, counties, or states. Users may advantageously use the methodology to, for example, update maps with new locations of bridges and roads, or simply update the map to conform with current symbol standards. The cartographic source data may also be representative of proposed developments and designs for a physical geographic location (e.g., building blue-prints or proposed routes for a new road). In various illustrative embodiments, the cartographic source data may be representative of a virtual location, such as a board in a video game, or a fictional location, such as "Middle Earth" as described in the novel "The Hobbit" by J. R. R. Tolkein.

The style data for the source data may be set as a default by a cartographic editing program using illustrative embodiments of the present invention (e.g., by a workspace itself). The workspace is a data file that persists an editing environment for a map. The workspace may contain the map legends which identify the feature classes being portrayed and the default styles used by each portrayed feature class. For example, if one of the feature classes for the source data is a group of rivers, then the workspace may display the rivers with a certain width or with a blue color as a default. The user may also be able to select and modify the display data for a source feature class. For example, the source feature class may be referenced in a legend. By modifying the width of the rivers in the legend, the width of every river in the representation will also be modified. For convenience, the default display data and/or user modified display data will be referred to as preset style data in the specification.

Once the source data is retrieved, at least some of the features classes of the source data base are displayed on the display device 804. To display the feature classes, the preset style is used. A user may select one of the features using, for example, a cursor. The user may then modify the geometry, style, or attribute data for the feature. For example, as described above for FIG. 4C, the user may change the location of a building, or the user may change the symbol for the building, as shown in FIGS. 2B, and 3B. The method then selects the source data corresponding to the user selection 806 and creates cartographic edit data representing the user modification of the feature 808. In illustrative embodiments of the present invention cartographic edit data is only created for the display parameters that are modified. In other words, if the user modifies the geometry of a feature, then cartographic edit data is created only for the geometry data. Cartographic edit data is not created for the attribute data and the style data for the feature.

Accordingly, this methodology saves storage space in the edits record set because edit data is only created for features and display parameters that are modified. However, other embodiments are also within the scope of the present invention. In some embodiments edit data can be created for all the display parameters even if only one display parameter is modified. For example, if a user modifies a style parameter, then cartographic edit data is created for all the geometric, style, and attribute data. Yet, in other embodiments, cartographic edit data can be created for only a subset of parameters. For example, if a user changes the color of a symbol, then cartographic data is only created for the color change. No cartographic edit data is created for the shape of the symbol or its size.

The methodology also associates the cartographic edit data representing the modification with the cartographic source data for the feature 810. In some embodiments, the cartographic edit data is associated with the source data by assigning an identifier (ID) to the edit data that matches an ID for the source data. In this specification, this identifier will be referred to as the source feature ID. Once the cartographic edit data is associated with the cartographic source data, the edit data is then stored in an edit record set 812. This methodology may be performed for each feature and feature class that the user modifies. For example, once the user modifies the location of building, as in FIG. 4C, the steps of selecting source data, creating edit data, associating data, and storing data may be repeated for a style edit, as shown in FIGS. 2B and 3B.

The source record set is stored in a source database. If the source data in the source record sets is read-only data, then the edit record set is stored in a separate edits database because the read-only records in the source database cannot be modified. In this way, the method provide the user with the perception that he is editing read-only source data. Although the source record set is displayed, there is no need for the source record set to be modified because all of the modifications to the display parameters are saved in the edit record set in the edits database. If the source data is read-and-write data, then the source record set and the edit record set can be stored in the same source database.

Furthermore, illustrative embodiments of the method allow the user to perform instance edits on a feature belonging to the feature class. Even though a feature may be part of the feature class in the source data, illustrative embodiments of the method allow the user to display the new edited display parameter for a single feature of the feature class because, as explained further below, the edited display parameter replaces the original source data for the feature when displayed.

Figure 9:
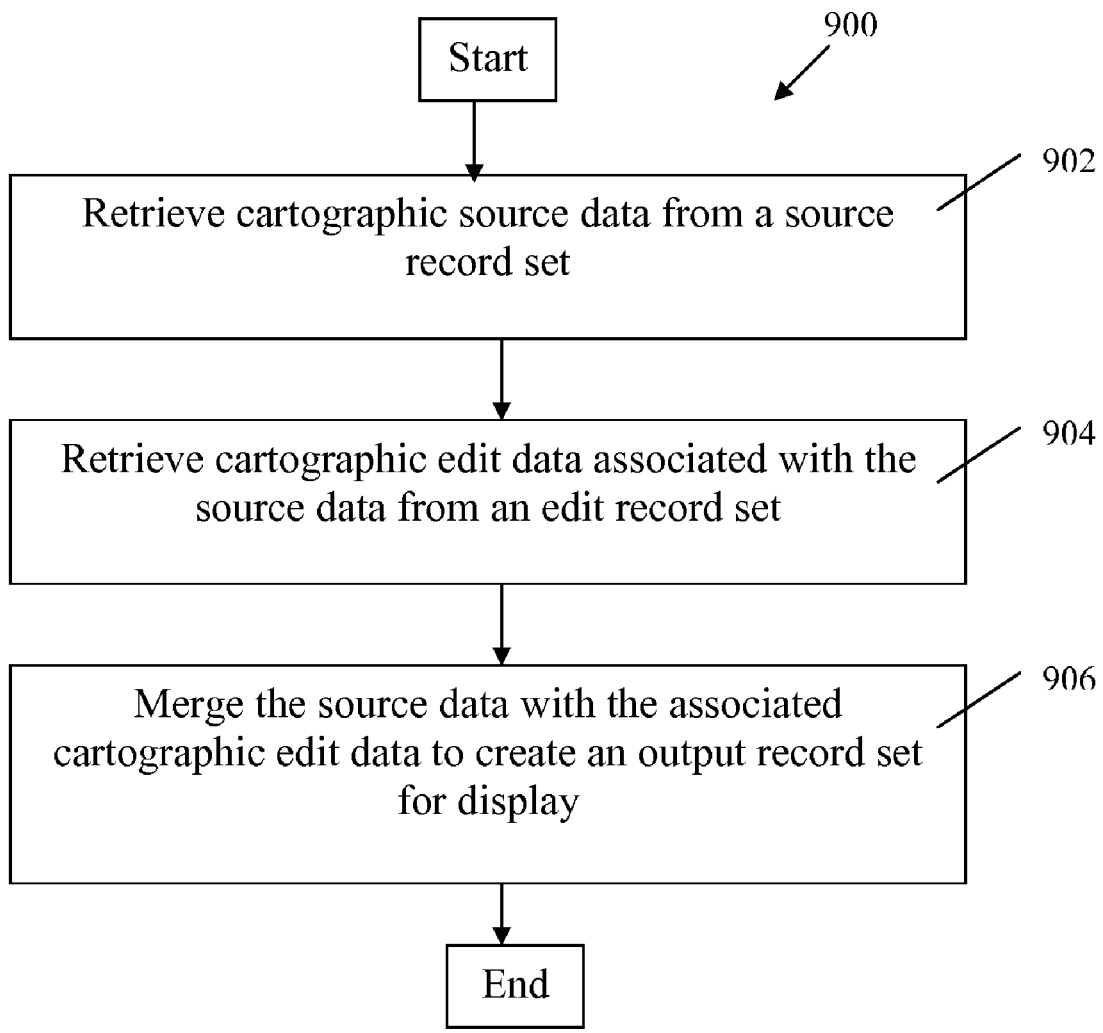
FIG. 9 shows a method for displaying cartographic data in accordance with one embodiment of the present invention.

FIG. 9 shows a method for displaying cartographic data in accordance with one embodiment of the present invention 900. This method is performed in a computer system that is in communication with a display device. The method involves retrieving cartographic source data for a feature from a source record set 902 and retrieving cartographic edit data associated with the source data from an edit record set 904. As explained above, the cartographic source data includes display parameters for a variety of different features that are viewable on the display device. Also, the source data may be read-only data and may come from a variety of different source databases with a variety of different structural formats. The edit record set may have one or more records. The cartographic data may come from a source database or from an edits database. Once retrieved, the source data for the feature and the edit data for the feature are merged to create an output record set for display on the display device 906. The output record set may then be displayed on the display device. The output record set may have one or more records. The steps of retrieving source data, retrieving edit data, and merging data may be performed a plurality of times for a plurality of features on the map. Every time the map is loaded the method may be performed a plurality of times to for each feature. The method may also be repetitively performed so that the features persist while the map is loaded on the display device. In other words, the method is performed so that the features are continuously updated with the latest edit data.

Furthermore, the methodologies of editing the feature, as discussed above, and displaying the features may be performed before or after one another, or they may be performed contemporaneously. Preferably, these methodologies are performed contemporaneously so that a user can edit a feature and have his edits appear on the display device nearly contemporaneously.

In some embodiments, hard-copies of the edited features and the map may be printed so that users could use the map for navigational purposes, or builders and surveyors may use the representation to for example, construct and build proposed buildings and/or routes.

Figure 10:
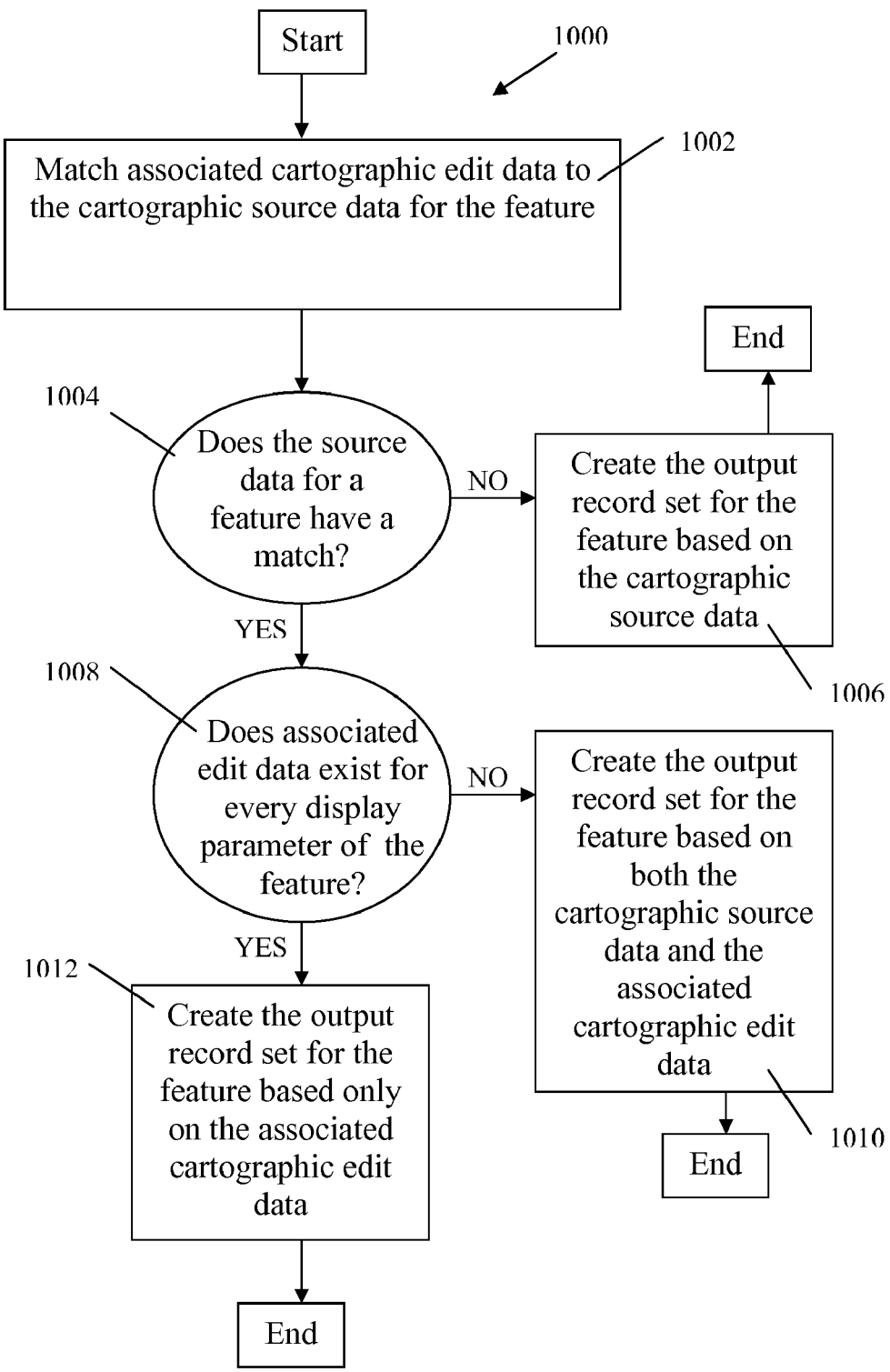
FIG. 10 shows a more detailed embodiment of the merging step from FIG. 9, in accordance with one embodiment of the invention.

FIG. 10 shows a more detailed embodiment of the merging step from FIG. 9 1000, in accordance with one embodiment of the invention. In illustrative embodiments of the present invention, the merging step may involve matching associated cartographic edit data to the cartographic source data for the feature 1002. In some embodiments, the edit data and the source data may be associated to each other based on a matching identifier. In this case, the methodology may match the associated cartographic edit data to the cartographic source data based on the matching identifier (e.g., source feature ID). If the source data for a feature has no match to cartographic edit data for the feature 1004, then the output record set for the feature is created based on the cartographic source data for the feature 1006 and the preset style data for the feature. For example, if the road 110 shown in FIG. 1A has no matching geometry, style, or attribute edits in the cartographic edits record set, then the source data for the road is displayed without any edits. If the source data for a feature has a match to associated cartographic edit data and associated cartographic edit data does not exist for every display parameter of the feature 1008, then the output record set for the feature is created based on both the source data and the associated edit data for the feature 1010. For example, if edit data exists for the style and attribute data of the feature, but not for the geometry data, then the output record set will include the style and attribute data from the edits record set and the geometry data from the source record set. In some cases, the source data may not be used when geometry and attribute data exist in the edits record set. Then, the output record set will include geometry and attribute data from the edit record set and preset style data from the workspace, but no data from the source record set. If the source data for a feature has a match to associated cartographic edit data and associated cartographic edit data exists for every display parameter of the feature 1008, the output record is created based only on the associated cartographic edit data for the feature 1012. For example, if cartographic edit data exists for the geometry, style, and attribute data for a feature, then the output record set for that feature will not include any source data and will consist of only edit data. In summary, if an edited display parameter exists for a feature, then it will replace the source data or preset style data for that parameter in the output record set.

As explained above, this methodology saves storage space because edit data is only created and stored for display parameters and features that are edited. If only one feature out of a thousand is edited, then the edits record set stores only the edits for that single edited feature and all of the other features are retrieved from the source record set. In contrast, some current cartographic editing systems require duplicating and storing the entire map and all of its associated features for each revision of the map.

Figure 11:
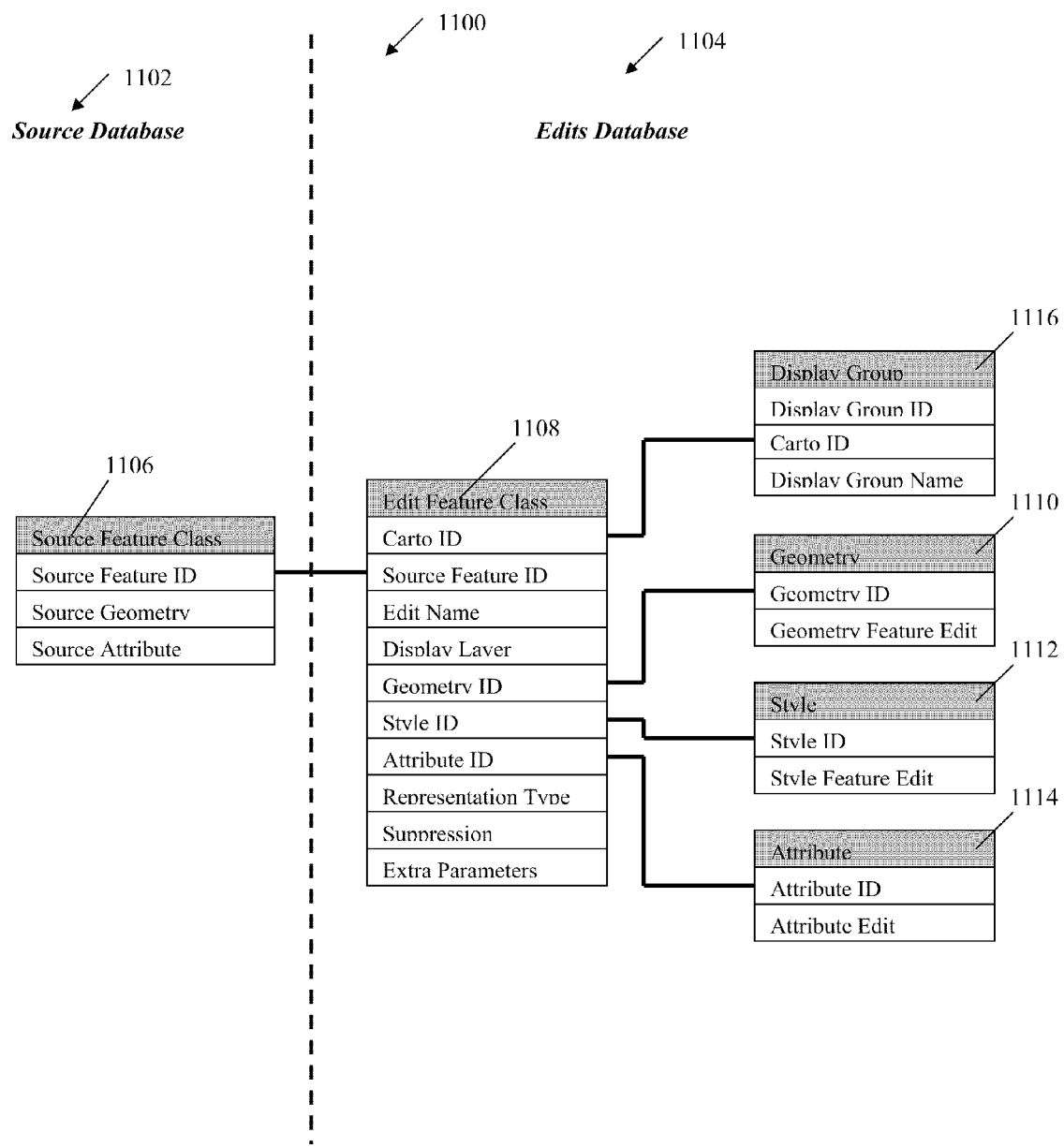
FIG. 11 shows a database table schema with table relationships in accordance with one embodiment of the present invention.

FIG. 11 depicts a database table schema 1100 with table relationships in accordance with one embodiment of the present invention. The schema is divided into a source database 1102 and an edits database 1104. However, in some embodiments, the edit data and source data may be stored in the same database. The source database includes a source feature class table 1106 that includes the geometry and attribute data defining each source feature class. (The style data comes from the preset style data provided by the workspace, but, in some embodiments, the source database may include style data). A source feature class table exists for each feature class of a cartographic representation. Each feature in the feature class has a record in the source feature class table. A description for each field in the source feature class table follows:

| Field Name | Comments: |
|---|---|
| Source Feature ID | The primary key for this table. This field contains an identifier that is unique to each feature in the feature class. A source feature ID exists for each feature in the feature class. |
| Source Geometry | This field includes geometry data defining the geometry and location of each feature in the feature class. The location and geometry may be defined by points in a coordinate system, or by vectors defining a line or an area, or by any spatial combination of points and vectors. |
| Source Attribute | This field includes attribute data for each feature in the feature class. Attribute data is descriptive information associated with a feature. |

The edits database includes an edit feature class table 1108. An edit feature class table exists for each source feature class that has an associated cartographic edit. Accordingly, for every source feature class table there is an associated edit feature class table 1106. In some embodiments, the name of an edit feature class table is generated using the name of the associated source feature class table, modified, if necessary, for size limitations and uniqueness (e.g., name of source feature table with prefix "ED"). The purpose of the edit feature class table is to link the display parameters and the display groups to the cartographically edited source features. Each edited feature in a feature class will have an associated edit feature record in the edit feature class table. Accordingly, there can be multiple edit feature records for a single source feature class table. A description for each field in the edit feature table follows:

| Field Name | Comments: |
|---|---|
| Carto ID | The primary key for this table. This field contains a unique identifier for each edited feature in the edit feature class table. |
| Source Feature ID | This field stores the key that associates the edit feature class table to the source feature class table. More specifically, it relates an edited feature record to a particular source feature record in the source feature class table. |
| Edit Name | The textual name for the edit. The user may enter this textual name. |
| Display Layer | This field is used to maintain display order for cartographically edited features. For example, in a cross roads, a road with a value of "3" will be displayed above a road with a value of "1." In other words, one road will mask the other road. |
| Geometry ID | This field stores a key that relates the edit feature class table to a geometry table |
| Style ID | This field stores a key that relates the edit feature class table to a style table |
| Attribute ID | This field stores a key that relates the edit feature class table to a attribute table |
| Representation Type | This field stores a value that indicates which display parameters have been edited for the feature. No edits = 0 (Source feature is displayed with no edits) Style edit = 1 Attribute edit = 1 Style and Attribute edit = 1 Geometry edit = 2 Geometry and style edits = 2 Geometry and attribute edits = 2 Geometry, style, and attribute edits = 2 Converted style (with any other edits) = 3 |
| Suppression | This field stores a value that indicates the suppression status of a feature. Displayed = 0 Suppressed = 1 |
| Extra Parameters | This field stores extra display parameters that can be used to modify the display of features. (e.g., modify the phase offset of a dashed line). |

The schema also includes display parameters tables for geometry 1110, style 1112, and attribute 1114 data. The geometry table, style table, and attribute table each store, respectively, geometry data, style data, and attribute data for a feature class that has been edited. For example, the geometry table will include a record for each geometrically edited feature in the feature class. In some embodiments, the name for the tables is generated using the name of the associated source feature class table, modified, if necessary, for size limitations and uniqueness (e.g., name of source feature class table with prefix "GEO" for geometry table, "STL" for style table, and "ATT" for attribute table). A description for each field in the geometry, style, and attribute tables follows:

| Geometry | |
|---|---|
| Field Name | Comments: |
| Geometry ID | The primary key for this table. This field stores the key that relates a record in the geometry table to a related record in the edit feature class table. |
| Geometry Feature Edit | This field includes geometry data defining the geometry and location of a geometrically edited source feature. The location and geometry may be defined by points in a coordinate system, or by vectors defining a line or an area, or by any spatial combination of points and vectors. |

| Style | |
|---|---|
| Field Name | Comments: |
| Style ID | The primary key for this table. This field stores the key that relates a record in the style table to a related record in the edit feature class table. |
| Style Feature Edit | This field includes style data for a stylistically edited source feature. |

| Attribute | |
|---|---|
| Field Name | Comments: |
| Attribute ID | The primary key for this table. This field stores the key that relates a record in the attribute table to a related record in the edit feature class table. |
| Attribute Edit | This field includes attribute data for a source feature whose attribute data has been edited. Attribute data is textual information associated with the feature. |

The style 1112, and attribute 1114 tables can be referenced by more than one edit feature 1108 record because several features may share the same edited styles or attributes and may, therefore, all be related to a single record in style or attribute tables. Accordingly, if the user decides to delete a style edit of a feature, the corresponding style table record will not be deleted if other edit feature records relate to that record in the style table. Also, if the user decides to modify a style for a feature with an existing style table record and the existing style table record is related to a number of other features, then a new style table record will be created for the newly edited feature so as to not disturb the style edits for the other features in the class.

FIG. 11 shows a database schema with separate tables containing geometric, style, and attribute edits 1110, 1112, 1114, other structures for the database schema are also within the scope of the present invention. For example, instead of storing the geometry, style, and attribute edits separately from edit feature class table 1106, the geometry, style, and attribute edits can be stored in additional fields in the edit feature class table. Although the table format in the edits database may vary, in illustrative embodiments of the present invention, the geometry, style, and attribute edits are typically stored separately from the source data. This database schema ensures that the original source data will not be overwritten because edit data and source data are stored separately.

The schema shown in FIG. 11 also includes a display group table 1116. The display group table assigns edited feature to groups for the purpose of simultaneously selecting edited feature. In some embodiments, the name for the display group table is generated using the name of the associated source feature class table, modified, if necessary, for size limitations and uniqueness (e.g., name of source feature table with prefix "DIS"). A Display Group Name field includes a text string that conforms to certain formatting rules and can be used in a query. The display group allows a user to simultaneously select all of the features associated with the display group. For example, the user may select the display group name "rivers" from a legend. A query is run for each edit feature record that is related to the display group name "rivers." Once all the related records are found, the user can then perform operations and commands on all of the records simultaneously. For example, the user may choose to suppress all of the records. Suppression of a record prevents the feature corresponding to the record from being displayed. The user may also choose to move up the display order for all of the features related to the display group name. By moving up their display order, the features will be display above other features. In other words, the features would mask the other features where they intersect.

Furthermore, more than one display group table record can be assigned to an edit feature class table. For example, an edit to a feature (and its corresponding record) may be related to the display group name "rivers" and also to the display group name "water." A query for either "rivers" or "water" would find the related edit feature record. A description for each field in the display group table follows:

| | |
|---|---|
| Display Group ID | The primary key for this table. |
| Carto ID | This field stores a carto ID. The carto ID relates the display group name to a particular record in the edit feature class table. |
| Display Group Name | The textual name of the display group (e.g., "rivers" or "roads"). |

Figure 12:
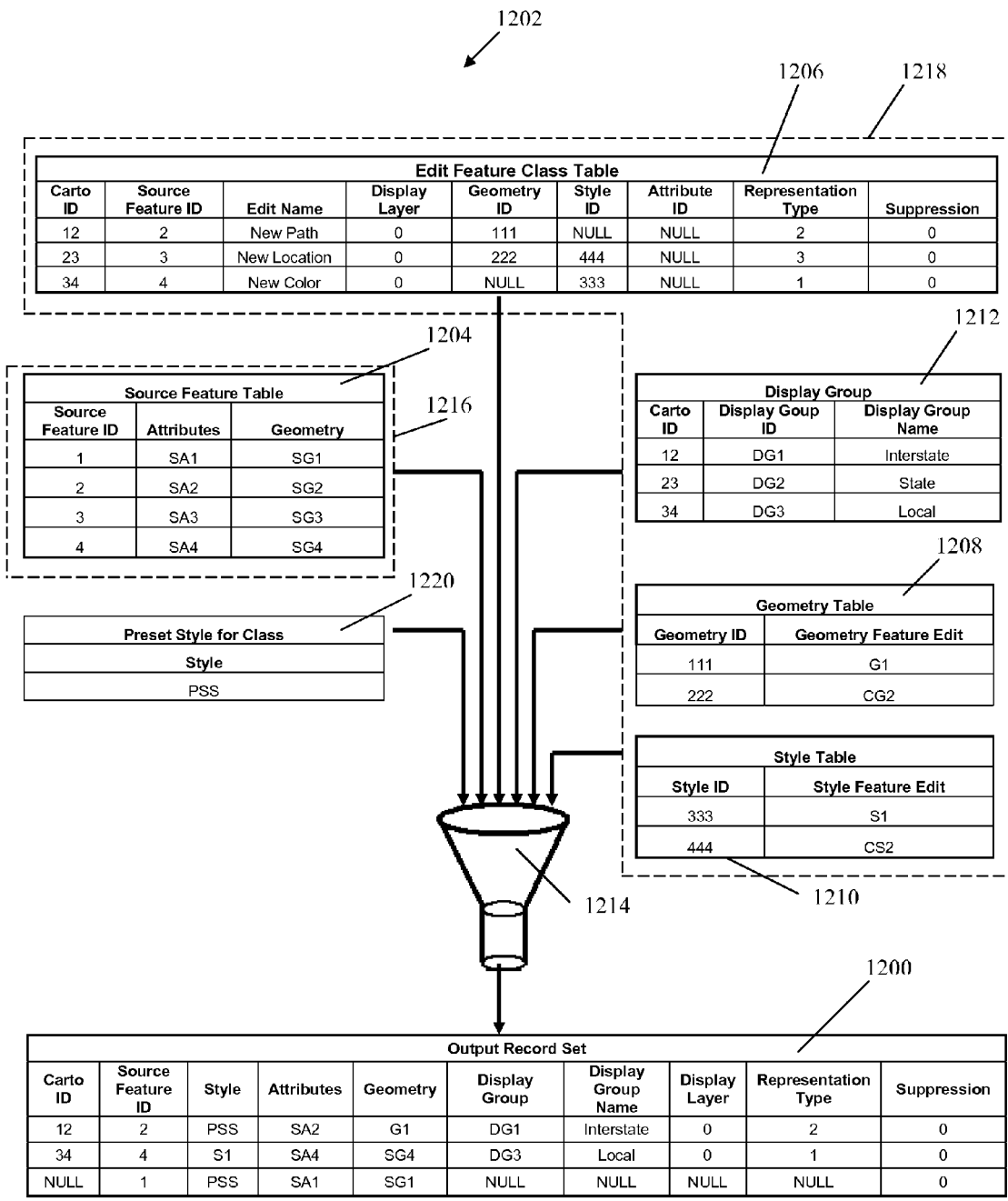
FIG. 12 shows an example of an output record set created from input record sets in accordance with one embodiment of the present invention.

FIG. 12 shows an example of an output record set 1200 created from an input record set 1202. In FIG. 12, the input record set 1202 includes the source record set 1216 from the source feature table 1204 and the edit data record set 1218 from the edit feature class table 1206, the display group 1212, geometry table 1208, and style table 1210. In illustrative embodiments of the present invention, the edit record set 1218 may contain any combination of edit feature class tables, geometry tables, style tables, attribute tables and display name tables depending on which feature class has been edited and which display parameter has been edited.

The source record set 1216 and edit record set 1218 are merged in a cartographic join pipe 1214. The cartographic join pipe contains the associations between the cartographic source data and the edit data, and intelligently matches the source data to the edit data. The cartographic join pipe merges the data by creating the output record set based on whether edit data matches source data for the feature. For example, if edited geometry data exists for a feature, but no edited style or attribute data exists, then the join pipe will output the edited geometry data with the source attribute data and the preset style data for the feature. The join pipe will also merge data based on user commands and operations. For example, the user may choose not to display any edits, in which case, the cartographic join pipe may turn off any merges between source data and edit data and simply output the source data.

The cartographic join pipe 1214 also associates edit data with source data as edits are created. In other words, the join pipe filters or segregates the edit data from edited features. For example, if the user modifies only the geometry of a feature, then the join pipe will store and associate only the edited geometry data for the feature. In this example, the join pipe will not store or associate display parameters that have not been edited. The associations and edit data that the join pipe creates later become part of the edit record set that the join pipe uses to create an output record set.

The input record sets 1202 include at least the source feature class table 1204 for the feature class to be displayed. If there are edits for the source feature class, then the associated edit feature class table 1206 and display parameter tables for the feature class (e.g., edit record set) will also be included in the input record set.

In the example provided in FIG. 12, there are four source features, 1, 2, 3, and 4 for the feature class. Each source feature has a corresponding record in the source feature class table. Geometry tables 1208 and style tables 1210 are provided as part of the input record set because the source feature records have associated geometry and style records. However, attribute tables and records are not provided as part of the input record set because attribute edits do not exist for any of the source records. All of the values in the edit feature tables under "attribute ID" are "NULL."

Source feature records 2, 3, and 4 have associated edit feature records in the edit feature class table, but source feature 1 does not have any associated edit feature records. This means that source record 1 has not been edited. Therefore, according to the method as explained above, the output record set for source feature record 1 will be created based only on the records in the source feature class table and the preset style data for the feature class. Thus, the output record set for source feature 1 corresponds to the records in the source feature class table and a preset style 1220.

Source feature records 2, 3, and 4, however, all have associated edits. Source feature record 2 has an associated edit feature class record with carto ID "12." The name for the edit associated with source feature record 2 is "New Path." Edit feature record 12 identifies a geometry with the geometry ID "111." This geometry ID corresponds with geometry record "G1" in the geometry table. The fields "style ID" and "attribute ID" in the edit feature record 12 contain a "NULL" value because no style and attribute edits exist for source feature 2. Accordingly, the output record set for source feature 2 includes the geometry record "G1" from the geometry table, the attribute record "SA2" from the source feature class table, and the preset style data "PSS" from the preset style 1220.

Source feature record 4 has an associated edit feature class record with carto ID "34." The name for the edit associated with source feature record 4 is "New Color." Edit feature record 34 identifies a style with the geometry ID "333." This style ID corresponds with style record "S1" in the style table. The "NULL" values under geometry ID and attribute ID indicate that there are no geometry and attribute edits for source feature record 4. Accordingly, the output record set for source feature record 4 includes the style "S1" from the style table, and the geometry and attribute data from the source feature table, "SG4" and "SA4." Together, the output record sets for source feature 1, 2, and 4 make up the output record set 1200 that is used to generate the map display. In this way, illustrative embodiments of the present invention allow source data and edit data to be joined, while also retaining identification for each original source feature and associated edit.

The output record set also contains the display group and the display group name from the display groups table 1212. These fields in the output record set allow a user to search the output record set for all the edited features associated with a particular group name. For example, the display group name "local" may contain all of the edits that have been performed on the local roads of a map.

In some instances, an edit feature table can exist for a source feature class, but there may not be an associated geometry, style, or attribute edit for the source feature class. For example, the user may decide to suppress one of the features in the feature class. When a user suppresses a source feature record, an associated edit feature record is created, but it may not be associated with any edits, instead the suppression field in the edit feature record receives a value of "1." Source feature records with suppression values of "1" are not displayed. In FIG. 12, source features record 2, 3, and 4 have associated suppression values of "0" and are, therefore, displayed. However, the source feature records may be suppressed by switching the "0" to a "1" in their associated edit feature records.

The user may also choose to display and suppress individual edits. The representation type field of the edit feature table stores a value that indicates which display parameters have been edited for the feature. The user may choose to suppress edits based on the value in the representation type field. For example, in FIG. 12, only edits with representation types of values "1" and "2" are displayed. A query may be run to select only those edit feature records with representation values of "1" and "2." Representation types of value "1" and "2" are non-converted edits. Representation types of value "3" are converted style edits and, because only representation types of values "1" and "2" are displayed (i.e., non-converted edits), source feature record 3 and its associated edit feature record is not part of the output record set.

Figure 13:
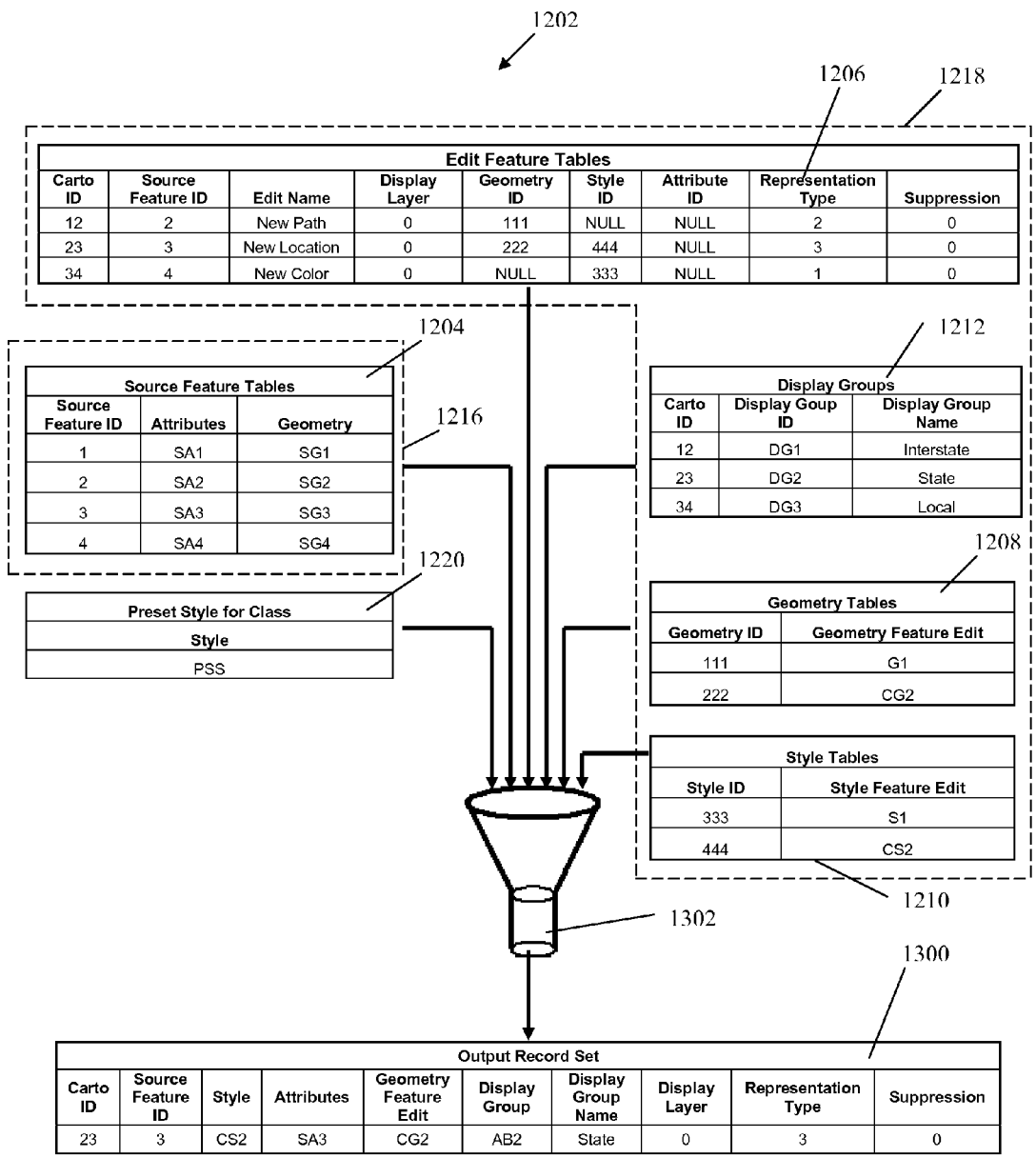
FIG. 13 shows another example of an output record set created from input record sets in accordance with one embodiment of the present invention.

FIG. 13 shows another example of an output record set 1300 created from input record set 1202 in accordance with one embodiment of the present invention. As can be seen in FIG. 13, in some embodiments, an output record set only contain one output record for a single feature. The output record set in FIG. 13 displays only edit feature records having representation types with a value of "3." In other words, the output record set includes only converted style edits. The edit feature record associated with source feature record 3 is edit feature record 23. The name of the edit is "New Location" and the edit feature class table identifies both a geometry edit and a converted style edit for the source edit record. The geometry ID "222" corresponds to geometry record "CG2" and the style ID "444" corresponds to the converted style record "CS2." Accordingly, the output record set for source feature record 3 includes the geometry record "CG2" from the geometry table, the converted style record "CS2" from the style table, and the attribute data from the source feature table, "SA3." As explained above, prestroking a feature is a converted style edit. When, for example, a symbol is prestroked, the converted style data and converted geometry data are stored in the edits database. The converted style data can be stored in the style table, and the converted geometry data can be stored in the geometry table, as shown in FIG. 13, or the converted style and geometry data can be stored together in their own converted style edits table.

FIGS. 12 and 13 are examples of output record sets for only one feature class. An output record set may also contain a plurality of records for a plurality of feature classes, in which case, the input record set would include a plurality of source feature class tables and a plurality of edit feature class tables with their associated display parameter tables.

In illustrative embodiments of the present invention, the cartographic join pipes 1214, 1302 shown in FIGS. 12 and 13 may be set as dedicated join pipes in a computer software product using the above described method. In other words, the cartographic join pipe may only operate on certain groupings of associations between features in the source database and edits in the edit database. For example, the cartographic join pipe 1214 in FIG. 12 is dedicated to non-converted edits (e.g., geometry, style, and cartographic edits). Whereas, the cartographic join pipe 1302 in FIG. 13 is dedicated to converted style edits. The inventors of the present invention have discovered that using dedicated cartographic join pipes is advantageous because certain associations can be readily turned on and off.

Figure 14:
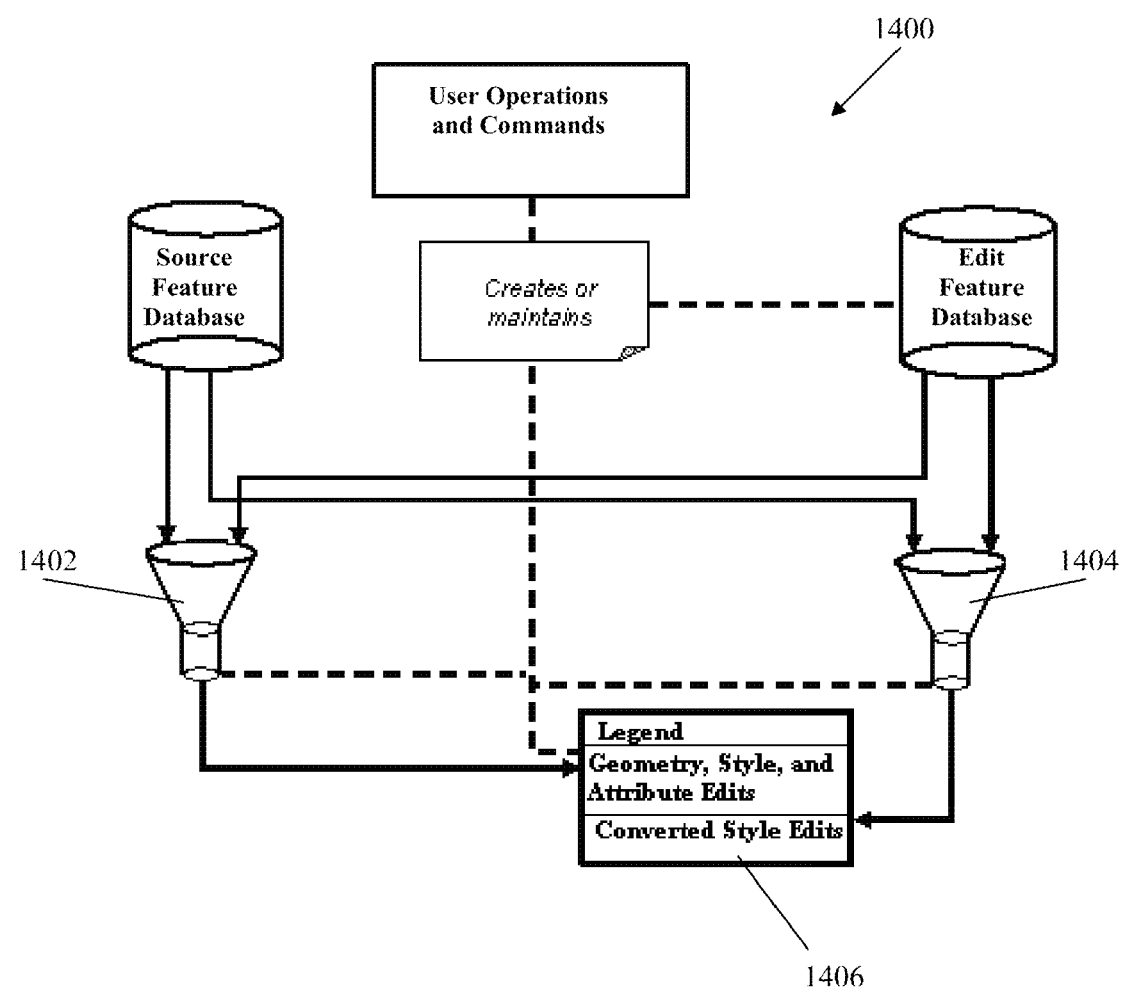
FIG. 14 shows an example of dual cartographic join pipe structure in accordance with one embodiment of the present invention.

FIG. 14 shows an example of dual cartographic join pipe structure 1400 in accordance with one embodiment of the present invention. A first cartographic join pipe 1402 is dedicated to non-converted edits and a second cartographic join pipe 1404 is dedicated to converted style edits. Each of the cartographic join pipes is referenced in a legend 1406. By clicking the join pipes on and off in the legend, the user is able to disable the merging of source data and edit data for the groupings of associations within the join pipes. As a result, the edits within the cartographic join pipes are not displayed. (Although the associations between the source data and the edit data continue to persist). Illustrative embodiments of the present invention, may use multiple cartographic join pipes. For example, one or more cartographic join pipes may be dedicated to suppression, geometry edits, style edits, attribute edits, or converted style edits.

Figure 15:
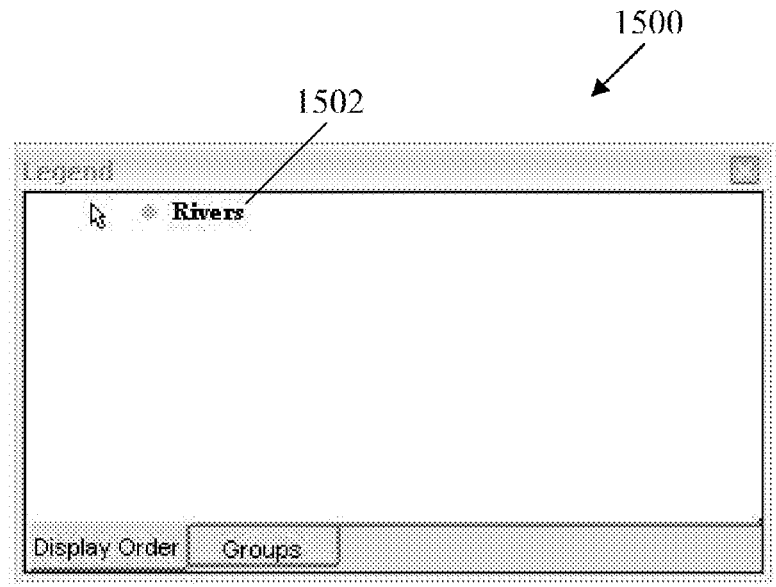
FIG. 15 shows an example of a legend in accordance with one embodiment of the present invention.

FIG. 15 shows an example of a legend 1500 in accordance with one embodiment of the present invention. The legend includes an icon 1502 representing a feature class named "Rivers." By selecting the Rivers icon the user is able to simultaneously select and edit the feature class.

Figure 16:
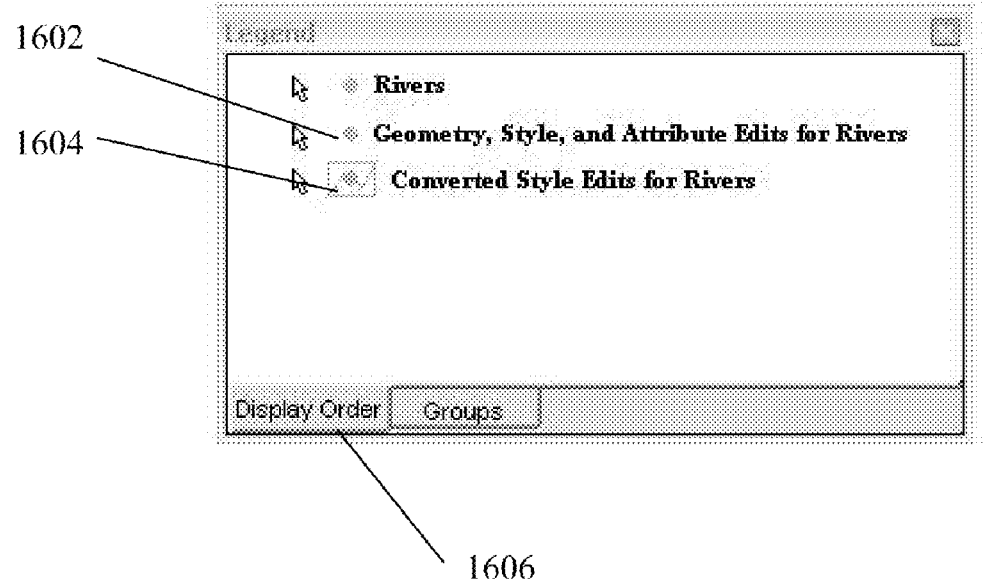
FIG. 16 shows an example of another legend in accordance with one embodiment of the present invention.

FIG. 16 shows an example of another legend 1600 in accordance with one embodiment of the present invention. After the user performs several geometry, style, attribute, and converted style edits, the legend may include icons representing particular cartographic join pipes. In FIG. 16, the legend includes icons for join pipes dedicated to non-converted style edits 1602 and converted style edits 1604. The user may simply click each join pipe on and off to either display the edits or suppress them. Also, the user may arrange the display order of the join pipes in a "Display Order" tab 1606 in the legend. In FIG. 16, the original source features are displayed above the non-converted and converted style edits.

Various embodiments of the disclosed methodology may be, at least in part, implemented in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

Various embodiments of the invention may be implemented as a system. A system for editing cartographic data includes a display device for displaying at least one feature of cartographic source data. The system also includes a user input device for selecting and modifying features in the display device. The user input device may be a mouse, joy-stick, key-board, or any other device that allows the user to select and modify cartographic data. The display device and the user input device are in communication with a processor. The processor retrieves cartographic source data from a source record set and selects source data in the first database corresponding to a selected feature. The source record may be stored in a local database in communication with the processor, or it may be retrieved over a computer network from a remote database.

Based on a modification of the feature, the processor creates cartographic edit data representing the modification of the feature and associates the cartographic edit data, representing the modification of the feature, with the cartographic source data for the feature. Also, the system includes a digital memory that is in communication with the processor. The digital memory stores the associated cartographic edit data within an edit record set The digital memory may be any of a random-access memory, a flash drive, a hard drive, or a disc drive.

A system for displaying cartographic data includes a display device for displaying an output record set. The display device is in communication with a processor. The processor retrieves cartographic source data for a feature from a source record set and retrieves cartographic edit data associated with the source data from an edit record set. The processor then merges the source data for the feature with the associated cartographic edit data for the feature to create an output record set for display on the display device.

In an alternative embodiment, the disclosed system and methods (e.g., see the various flow charts described above) may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be a tangible medium (e.g., optical or analog communications lines). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. The method and system of the present invention have been disclosed as applied to cartographic data, however, the method and system of the present invention may be applied to other types of data. For example, the method and system of the present invention may be applied to computer-aided design data, computer-aided manufacturing data, spreadsheet data, and word processing data. All such variations and modifications are intended to be within the scope of the present invention as defined in any appended claims.

What is claimed is:

1. A computer based method for editing cartographic data, the method comprising:
    retrieving, in a computer system, cartographic source data from a first record set and displaying at least one feature of the source data in a display device;
    based on a computer input by a user selecting a feature in the display device, identifying, in the computer system, cartographic source data corresponding to the selected feature;
    responsive to a computer input by the user instance editting the selected feature in the display device, creating cartographic edit data representing the user's instance edit of the feature without modifying the retrieved cartographic source data;
    associating the cartographic edit data, representing the user's instance edit of the feature, with the unmodified cartographic source data for the feature;
    storing the associated cartographic edit data within a second record set that is editable by further user instance edits of features; and
    creating, in the computer system, an output record set for display on the display device by merging the unmodified cartographic source data and the associated cartographic edit data without modifying the unmodified cartographic source data.

2. A method according to claim 1, wherein the cartographic edit data is at least one of geometry data, style data, and attribute data.

3. A method according to claim 1, wherein the cartographic source data represents a physical geographic location.

4. A method according to claim 1, wherein at least a portion of the cartographic source data is read-only data.

5. A method according to claim 1, wherein associating the cartographic edit data with the unmodified cartographic source data for the feature comprises assigning an identifier to the edit data matching an identifier for the source data.

6. A method according to claim 1, wherein the first record set is stored in a first database and the second record set is stored in a second database.

7. A computer based method for displaying cartographic data, the method comprising:
    retrieving from a first record set in a computer system cartographic source data including a plurality of features;
    retrieving, in the computer system, cartographic edit data from a second record set that is editable by a user inputting modifications of features into the computer system;
    matching cartographic edit data to corresponding features in the cartographic source data; and
    creating, in the computer system, an output record set, wherein, if cartographic source data matches cartographic edit data for at least one of the features then using cartographic edit data for at least one display parameter of the at least one feature and omitting, from the output record set, cartographic source data for the at least one display parameter of the at least one feature, and if the cartographic source data for one of the features has no match with the cartographic edit data then using only the cartographic source data for the one of the features, wherein the output record set is created without modification to the cartographic source data,
    causing display of the output record set on a display device.

8. A method according to claim 7, wherein the cartographic edit data is at least one of geometry data, style data, and attribute data.

9. A method according to claim 7, wherein the cartographic edit data represents a feature instance edit.

10. A method according to claim 7, wherein the cartographic source data represents a physical geographic location.

11. A method according to claim 7, wherein at least a portion of the cartographic source data is read-only data.

12. A method according to claim 7, wherein the cartographic source data and the associated cartographic edit data for corresponding features have matching identifiers.

13. A method according to claim 7, if the cartographic source data for the at least one feature has a match to the cartographic edit data and the cartographic edit data does not exist for every display parameter of the at least one feature, the output record set for the at least one feature is created using both the cartographic source data and the cartographic edit data for the at least one feature.

14. A method according to claim 7, wherein, if the cartographic source data for the at least one feature has a match to the cartographic edit data and the cartographic edit data exists for every display parameter of the at least one feature, the output record set for the at least one feature is created using only the cartographic edit data for the at least one feature.

15. A method according to claim 7, wherein the first record set is stored in a first database and the second record set is stored in a second database.

16. A method according to claim 7, further comprising:
based on a computer input by the user selecting the feature in the display device, identifying, in the computer system, cartographic source data corresponding to the selected feature;
responsive to a computer input by the user modifying the selected feature in the display device, creating cartographic edit data representing the user's modification of the feature;
associating the cartographic edit data representing the user's modification of the feature with the cartographic source data for the feature; and
storing the associated cartographic edit data within the second record set.

17. A system for editing cartographic data, the system comprising:
a display device for displaying at least one feature of cartographic source data;
a user input device for selecting and modifying features in the display device;
a processor for retrieving cartographic source data from a first record set and selecting cartographic source data corresponding to a selected feature;
wherein, responsive to an instance edit by a user through the user input device of the selected feature, the processor creates cartographic edit data representing the instance edit of the feature without modifying the retrieved cartographic source data and associates the cartographic edit data, representing the instance edit of the feature, with the unmodified cartographic source data for the feature; and
wherein the processor creates an output record set for display on the display device by merging the unmodified cartographic source data and the associated cartographic edit data for the feature without modifying the unmodified cartographic source data; and
a digital memory for storing the associated cartographic edit data within a second record set that is editable by further instance edits of features by the user through the user input device.

18. A system according to claim 17, wherein the cartographic edit data is at least one of geometry data, style data, and attribute data.

19. A system according to claim 17, wherein at least a portion of the cartographic source data is read-only data.

20. A system according to claim 17, wherein the processor associates the cartographic edit data with the unmodified cartographic source data for the feature by assigning an identifier to the edit data matching an identifier for the source data.

21. A system according to claim 17, wherein the first record set is stored in a first database and the second record set is stored in a second database.

22. A system for displaying cartographic data, the system comprising:
a display device for displaying an output record set; and
a processor for retrieving cartographic source data for a plurality of features from a first record set and retrieving cartographic edit data from a second record set that is editable by a user inputting modifications of features into the system;
wherein the processor is configured to match cartographic edit data to corresponding features in the cartographic source data;
wherein the processor is configured to create the output record set and wherein, if cartographic source data matches cartographic edit data for at least one of the features, the processor uses cartographic edit data for at least one display parameter of the at least one feature and omits, from the output record set, cartographic source data for the at least one display parameter of the at least one feature, and if cartographic source data for one of the features has no match with cartographic edit data, the processor uses only the cartographic source data for the one of the features; and
wherein the processor is configured to create the output record set without modification to the cartographic source data.

23. A system according to claim 22, wherein the cartographic edit data is at least one of geometry data, style data, and attribute data.

24. A system according to claim 22, wherein the cartographic edit data represents a feature instance edit.

25. A system according to claim 22, wherein at least a portion of the cartographic source data is read-only data.

26. A system according to claim 22, wherein the cartographic source data and the associated cartographic edit data for corresponding features have matching identifiers.

27. A system according to claim 22, wherein, if the cartographic source data for the at least one feature has a match to the cartographic edit data and the cartographic edit data does not exist for every display parameter of the at least one feature, the processor creates the output record set for the at least one feature using both the cartographic source data and the cartographic edit data for the at least one feature.

28. A system according to claim 22, wherein, if the cartographic source data for the at least one feature has a match to the cartographic edit data and the cartographic edit data exists for every display parameter of the at least one feature, the processor creates the output record set for the at least one feature using only the cartographic edit data for the at least one feature.

29. A system according to claim 22, wherein the first record set is stored in a first database and the second record set is stored in a second database.

30. A system according to claim 22, further comprising:
a user input device for selecting and modifying features in the display device, wherein, based on a selection by the user of the feature in the display device, the processor selects cartographic source data corresponding to the selected feature and, based on a modification of the feature by the user, the processor creates cartographic edit data representing the modification of the feature and associates the cartographic edit data representing the modification of the feature with the cartographic source data for the feature; and
a digital memory for storing the associated cartographic edit data within the second record set.

31. A computer program product for use on a computer system for editing cartographic data, the computer program product comprising a computer readable storage medium having computer readable code thereon, the computer readable program code comprising:

computer code for retrieving cartographic source data from a first record set and displaying at least one feature of the source data in a display device;

computer code for identifying source data corresponding to a selected feature responsive to a computer input by a user selecting the feature in the display device;

computer code for creating cartographic edit data representing an instance edit of the selected feature responsive to a computer input by the user modifying the selected feature in the display device wherein the cartographic edit data is created without modifying the retrieved cartographic source data computer code for associating the cartographic edit data, representing the user's instance edit of the feature, with the unmodified cartographic source data for the feature;

computer code for storing the associated cartographic edit data within a second record set that is editable by further user instance edits of features; and creating an output record set for display on the display device, by merging the cartographic source data and the associated cartographic edit data without modifying the unmodified cartographic source data.

32. A computer program product according to claim 31, wherein at least a portion of the cartographic source data is read-only data.

33. A computer program product according to claim 31, further comprising:

computer code for assigning an identifier to the edit data matching an identifier for the source data.

34. A computer program product according to claim 31, wherein the first record set is stored in a first database and the second record set is stored in a second database.

35. A computer program product for use on a computer system for displaying cartographic data, the computer program product comprising a computer readable storage medium having computer readable code thereon, the computer readable program code comprising:

computer code for retrieving from a first record set cartographic source data including a plurality of features;

computer code for retrieving cartographic edit data from a second record set that is editable by a user inputting modifications of features into the computer system;

computer code for matching cartographic edit data to corresponding features in the cartographic source data; and computer code for creating an output record set, wherein, if cartographic source data matches cartographic edit data for the at least one of the features then using cartographic edit data for at least one display parameter of the at least one feature and omitting, from the output record set, cartographic source data for the at least one display parameter of the at least one feature, and if the cartographic source data for one of the features has no match with the cartographic edit data then using only the cartographic source data for the one of the features, wherein the output record set is created without modification to the cartographic source data; and computer code for causing display of the output record set on a display device.

36. A computer program product according to claim 35, further comprising:

computer code for creating the output record set for the at least one feature using both the cartographic source data and the cartographic edit data for the at least one feature, if the source data for the at least one feature has a match to cartographic edit data and the cartographic edit data does not exist for every display parameter of the at least one feature.

37. A computer program product according to claim 35, further comprising:

computer code for creating the output record set for the at least one feature using only the cartographic edit data for the at least one feature if the cartographic source data for the at least one feature has a match to cartographic edit data and cartographic edit data exists for every display parameter of the at least one feature.

38. A computer program product according to claim 35, wherein the first record set is stored in a first database and the second record set is stored in a second database.

39. A computer program product according to claim 35, further comprising computer code for identifying cartographic source data corresponding to a selected feature responsive to a computer input by the user selecting the feature in the display device;

computer code for creating cartographic edit data representing a modification of the selected feature responsive to a computer input by the user modifying the selected feature in the display device;

computer code for associating the cartographic edit data, representing the user modification of the feature, with the cartographic source data for the feature; and computer code for storing the associated cartographic edit data within the second record set.

\* \* \* \* \*

UNITED STATES PATENT AND TRADEMARK OFFICE
CERTIFICATE OF CORRECTION

PATENT NO. : 8,386,426 B2  Page 1 of 1
APPLICATION NO. : 12/334244
DATED : February 26, 2013
INVENTOR(S) : Owen, Jr. et al.

It is certified that error appears in the above-identified patent and that said Letters Patent is hereby corrected as shown below:

In the Claims

Claim 1, column 17, line 66
replace "editting"
with "editing"

Claim 31, column 21, line 22
replace "the cartographic source data"
with "the unmodified cartographic source data"

Claim 35, column 22, line 1
replace "for the at least one"
with "for at least one"

Signed and Sealed this
Eighteenth Day of February, 2014

Michelle K. Lee
*Deputy Director of the United States Patent and Trademark Office*